July 24, 1962     J. E. HAWKINS ETAL     3,046,553
SEISMIC REPRODUCING AND RECORDING DEVICE
Filed Sept. 28, 1956                              5 Sheets-Sheet 1

INVENTORS
JAMES E. HAWKINS
ROBERT W. BALTOSSER AND
SIDNEY W. SCHOELLHORN

ATTORNEYS

July 24, 1962   J. E. HAWKINS ETAL   3,046,553
SEISMIC REPRODUCING AND RECORDING DEVICE
Filed Sept. 28, 1956   5 Sheets-Sheet 2
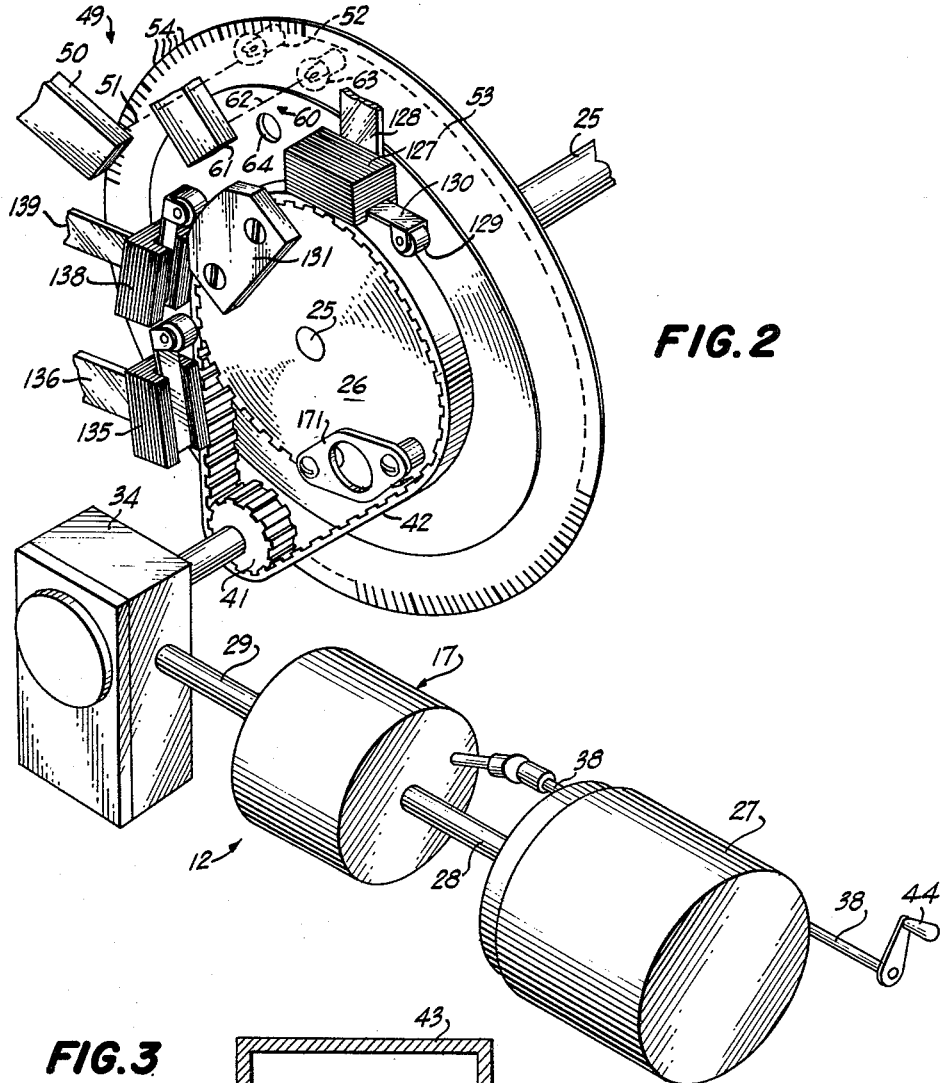
FIG. 2
FIG. 3
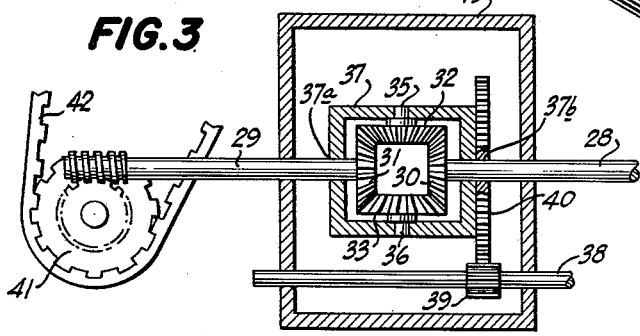
INVENTORS
JAMES E. HAWKINS
ROBERT W. BALTOSSER AND
SIDNEY W. SCHOELLHORN
BY Macon, Kalehmainen, Rathburn and Wyss
ATTORNEYS

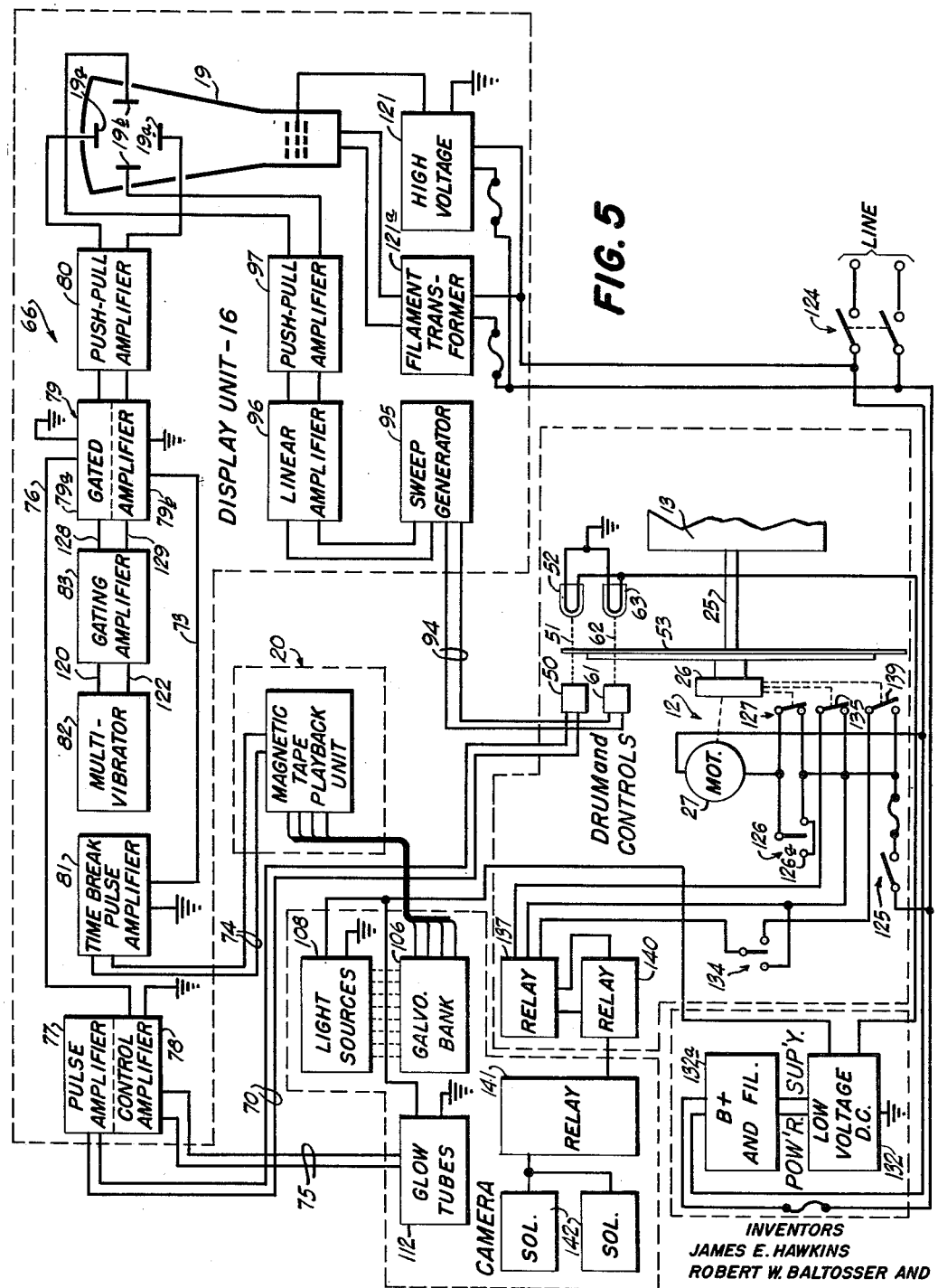

July 24, 1962  J. E. HAWKINS ETAL  3,046,553
SEISMIC REPRODUCING AND RECORDING DEVICE
Filed Sept. 28, 1956  5 Sheets-Sheet 4

INVENTORS
JAMES E. HAWKINS
ROBERT W. BALTOSSER AND
SIDNEY W. SCHOELLHORN
BY
ATTORNEYS

July 24, 1962   J. E. HAWKINS ETAL   3,046,553
SEISMIC REPRODUCING AND RECORDING DEVICE
Filed Sept. 28, 1956   5 Sheets-Sheet 5
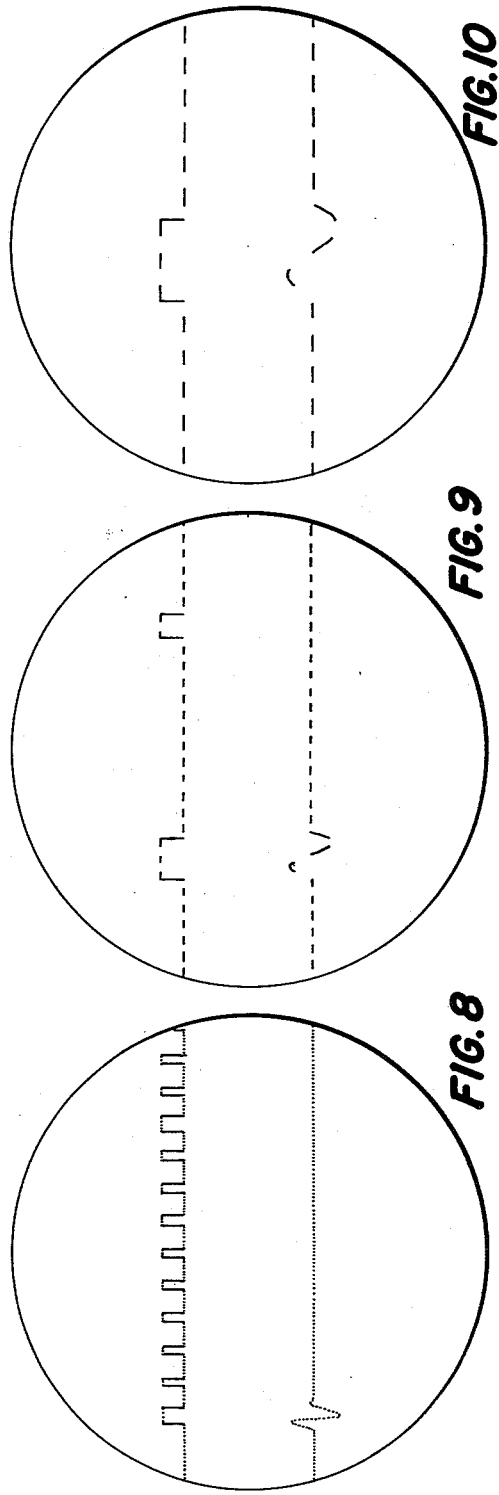
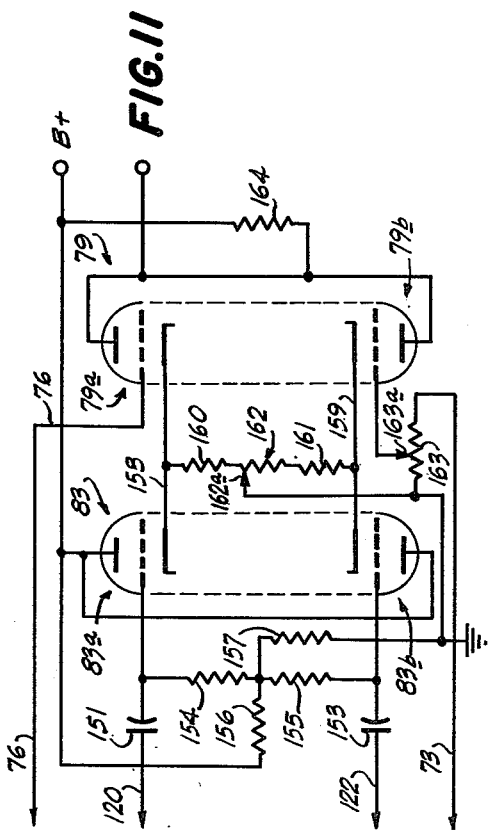
INVENTORS
JAMES E. HAWKINS
ROBERT W. BALTOSSER AND
SIDNEY W. SCHOELLHORN
BY
Mason, Kolehmainen, Rathburn and Wyss
ATTORNEYS

United States Patent Office 3,046,553
Patented July 24, 1962

3,046,553
SEISMIC REPRODUCING AND RECORDING DEVICE
James E. Hawkins, Broken Arrow, Sidney W. Schoellhorn, Tulsa, and Robert W. Baltosser, Broken Arrow, Okla., assignors to Seismograph Service Corporation, Tulsa, Okla., a corporation of Delaware
Filed Sept. 28, 1956, Ser. No. 612,779
15 Claims. (Cl. 346—17)

The present invention relates to an apparatus for reproducing signals from a plurality of seismic records and recording the reproduced signals as a plurality of seismic wave traces disposed in side by side relationship on a single record, and, more particularly, to an apparatus for recording sequentially on a single record groups of signals reproduced from separate individual records in order to obtain a profile representative of a geological cross-section of a portion of the earth's subsurface structure.

It has been customary when exploring subsurface strata to generate elastic wave vibrations from a shot point and then to record directly or indirectly on a reproducible record, as, for example, on a magnetizable medium or record, signals corresponding to vibrations received by way of reflection or refraction from the subsurface formations at a plurality of spaced apart, colinear seismometers or detectors located at some distance from and arranged along a line extending through the shot point. The signals stored on the magnetic records may then be played back at a subsequent time and employed to produce visual or oscillographic records at which time these signals may be corrected or phase displaced in order to compensate for time displacements resulting from such factors as the so-called "weathering" effect and "spread" effect. As described in detail in copending application Serial No. 362,766 filed June 19, 1953, now Patent No. 2,946,393 by James E. Hawkins and assigned to the same assignee as the present invention, to provide a geographic profile of any great length, a number of separate reproducible records are preferably obtained by using different, horizontally displaced shot points with a corresponding displacement of the seismic wave detectors so that each such record contains signals reflected from a portion of the subsurface strata. After proper time correction of all of the signals derived from these records, several of the oscillographic or visual records produced may be disposed in side by side relationship in well log form so that the aligned reflected wave signals are representative of the disposition of the subsurface strata. In the arrangement disclosed in the Hawkins application referred to above the individual oscillographic records must be aligned manually, a process which is both laborious and time consuming, and, accordingly, the present invention is concerned with an improved reproducing and recording device for carrying out the method described and claimed in the Hawkins application in which the reproduced signals are time related and then recorded automatically on a single record, thereby avoiding manual alignment of the records.

It is, accordingly, an object of the present invention to provide an improved reproducing and recording device which achieves the desired results discussed above.

It is another object of the present invention to provide a playback and recording device for recording on a single record groups of seismic traces corresponding to signals reproduced from a plurality of individual records supplied in sequence to the device.

Another object of the present invention is to provide a reproducing and recording device adapted to produce on a single record a plurality of phase related, side by side seismic traces representative of signals reproduced from a plurality of separate reproducible seismic records after correction for weathering and spread effects.

It is another object of the present invention to provide a reproducing and recording device for providing on a single record groups of side by side seismic traces with each group corresponding to signals reproduced from a different reproducible record wherein the different reproducible records are replayed in sequence and in time correlation with respect to the single record.

Still another object of the present invention is to provide a reproducing and recording device for producing a single record containing groups of seismic traces respectively corresponding to groups of signal traces reproduced from different sequentially played back reproducible records and to provide means for phase relating the position of the single record and each of the reproducible records in order to assure alignment of the groups of seismic traces.

Still a further object of the present invention resides in the provision of a reproducing and recording device of the character described above including means for adjusting the phase relationship between the signal reproduced from the different reproducible records in order to provide a common time base for all of the reproduced signals whereby all of the seismic traces produced on the single record are correlated with respect to time.

A further object of the present invention is to provide a reproducing and recording device of the aforementioned character wherein the phase adjustment is effected by differential gearing connected in the drive mechanism for the single record to phase relate the different reproducible records sequentially played back.

Another object of the present invention is to provide reproducing and recording apparatus of the type described including a carriage for housing a plurality of recording instruments laterally movable relative to the single record, which carriage is selectively positionable in predetermined positions respectively corresponding to the different reproducible records sequentially played back in order to facilitate recording of the groups of seismic traces in side by side relationship.

Still a further object of the present invention is to provide a reproducing and recording device of the character indicated in which recording of the seismic wave traces is effected during only one cycle of operation, thus preventing superimposed recording, and in which signals reproduced from the reproducible records may be viewed prior to recording in order to indicate that the recording instruments are functioning.

It is likewise an object of the present invention to provide reproducing and recording apparatus of the type described having a new and improved arrangement for loading and unloading the permanent record.

The above and other objects are achieved in accordance with the present invention by providing apparatus for sequentially reproducing signals recorded as a plurality of signal traces on different reproducible records and for re-recording the signals reproduced from all of the records as a plurality of side by side seismic traces appearing on a single permanent record. The signals are phase adjusted to correct for weathering, spread effect, elevational differences and the like prior to recording on the reproducible record so that the side by side seismic traces appearing on the permanent record, when properly aligned in corresponding time positions, represent an accurate geological cross-section of portions of the earth's subsurface formations. In this form of the invention, the individual reproducible records are sequentially supplied to a playback unit for the purpose of simultaneously reproducing or playing back a group of signals corresponding to the signal traces appearing on each reproducible record. Each group of reproduced signals is applied to recording instruments housed within a common carriage which is mounted for movement laterally of the permanent record. The carriage is manually moved in sequence to a plurality of preselected fixed positions respectively corresponding to the different reproducible records played back so that the groups of signals reproduced from all of the records appear as groups of seismic traces disposed in side by side relationship on the single record. In order to phase relate the rotation of the single record with each of the reproducible records for the purpose of aligning the groups of recorded seismic traces, each of the reproducible records and the permanent record are driven by synchronous prime movers excited from a common source and a manually operable phase adjusting mechanism is included in the drive mechanism for the permanent record. To facilitate adjustment of the phase relationship existing between the records reference or timing signals are developed for comparison with reproduced time break signals derived from each of the reproducible records. To this end, the timing signals and the reproduced time break signals are simultaneously applied to a display unit which is referred to in making the phase adjustment. Thus, the time break signals reproduced from each reproducible record may be time correlated so that all of these time break signals are aligned laterally of the permanent record with the result that the seismic wave signals of all of the permanent record traces appear in proper time positions.

A control circuit is provided to facilitate loading and unloading of the permanent record, automatically to render the recording instruments effective after the permanent record is in condition for the recording operation and after the phase adjustment described above has been completed, and automatically to render the recording instruments ineffective in order to prevent recording of superimposed signals. By sequentially supplying a plurality of reproducible records to the recording device, making the required phase adjustments for each reproducible record, re-recording the group of signals reproduced from each of the reproducible records, and displacing the recording instruments laterally of the permanent record after re-recording of each group of signals, a plurality of side by side traces are produced exhibiting seismic wave signals reflected from each subsurface stratum in alignment, thus providing a profile of a portion of the earth's formations.

Many other objects and advantages of the present invention will become apparent from a consideration of the specification in conjunction with the following drawings, wherein:

FIG. 2 is a fragmentary, partially diagrammatic, perspective view of a portion of the recording device of FIG. 1, illustrating particularly the drive mechanism for the camera drum, together with a portion of a control system;

FIG. 3 is an enlarged sectional view taken along a line substantially corresponding to line 3—3 in FIG. 2;

FIG. 5 is a schematic diagram illustrating the control circuit of the present invention, together with the display unit for facilitating record alignment;

FIGS. 8, 9 and 10 illustrate the indications provided by the display unit for slow, intermediate and fast sweep speeds, respectively; and FIG. 11 is a schematic diagram illustrating certain of the circuits in the display unit.

In accordance with the present invention, a single permanent record is produced from signals reproduced from a plurality of reproducible records played back in sequence. Each of the latter records includes a group of seismic signals comprising a plurality of signal traces with each trace being representative of the seismic vibrations detected by one of the seismometers in a colinear array spaced from and preferably arranged along a horizontal line extending through the source of the vibrations. The reproducible records are produced on a per shot basis, that is, each reproducible record represents the signal arriving at the detector array as a result of the energy propagated from a single shot point and, in a complete survey, the various shot points are displaced horizontally with a corresponding displacement of the detector array in the manner described in the above-identified Hawkins application.

Figure 1:
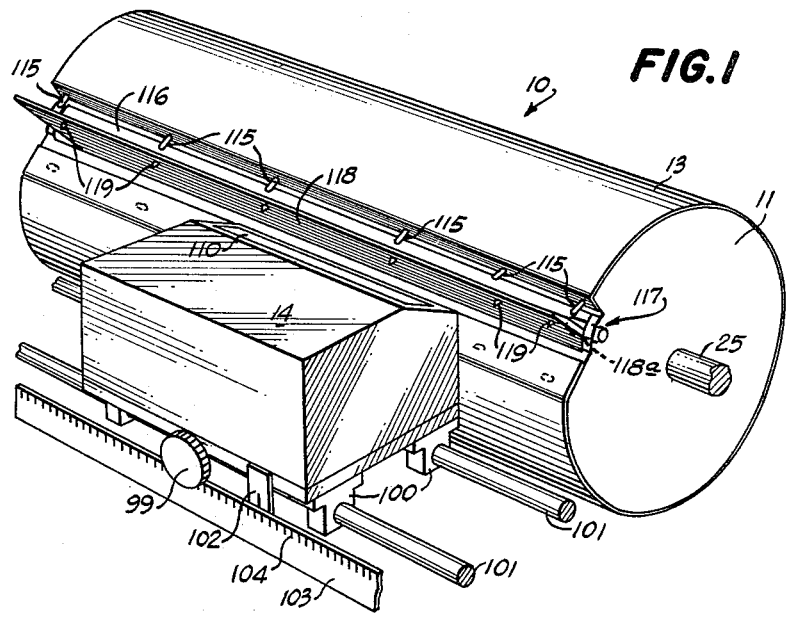
FIG. 1 is a fragmentary, perspective view of a portion of the recording device of the present invention illustrating the camera drum for supporting the permanent record and a laterally movable carriage for housing a plurality of recording instruments.
Figure 4:
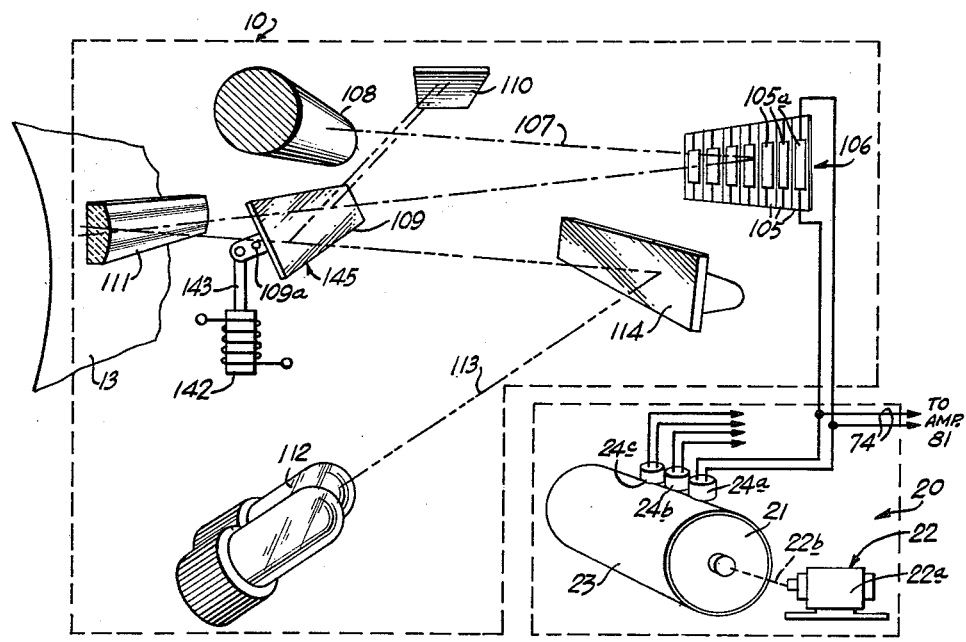
FIG. 4 is a diagrammatic view of the reproducing and recording apparatus of the present invention.

Referring now to the drawings, and particularly to FIGS. 1, 2 and 3 thereof, the recording portion of the apparatus of the present invention is identified by reference numeral 10 and comprises a cylindrical camera drum 11 (FIG. 1) which is rotated by a drive mechanism 12 (FIG. 2) and which supports a recording medium or permanent record 13 made of photosensitive material adapted to produce marks or traces when exposed to a beam of light. The permanent record produced may be either of the variable amplitude or variable density type. A carriage 14 mounted for lateral movement relative to the medium 13 houses a plurality of recording instruments (FIG. 4) operable to generate a plurality of light beams which may be varied in response to the amplitude variations of signals developed by a playback unit 20.

If a variable density record is being produced, the intensities of the light beams are controlled by the signals reproduced by the playback unit but, to simplify the description, it will be assumed that a variable amplitude record is desired and, to this end, the reproduced signals are employed to control the movements of the light beams laterally of the medium 13. Hence, the playback unit is of conventional construction and comprises a playback drum 21 rotated by a drive mechanism 22 which includes a synchronous drive motor 22a and a drive connection represented by broken line 22b. The drive connection 22b preferably includes a reduction gearing of conventional construction to effect the rotation of the drum 21 at a speed suitable for reproduction of the signals appearing on reproducible record 23. A plurality of reproducing heads or transducers 24a, 24b, 24c. etc. are provided for reproducing the seismic signals stored on each of the reproducible records 23 stretched over or loaded upon the drum 21, there being one such reproducing head for each of the traces on the reproducible record. In accordance with one application of the present invention, twenty-four trace reproducible records are employed and, accordingly, a corresponding number of reproducing heads are required. The signals developed by each of the reproducing heads are supplied to the recording device 10 where, as indicated above, they are respectively employed to control the movement of the light beams laterally of the medium 13 in a manner described more fully below.

As previously mentioned, the individual reproducible records are supplied in sequence to the playback unit 20 so that all of the signal traces appearing on each record are simultaneously reproduced by the heads 24a, 24b, 24c, etc. These signal traces, prior to recording, have been phase corrected in any suitable manner, as, for example, by selectively displacing the recording heads in order to compensate for weathering, spread effects, differences in elevation of the seismometers in the detector array resulting from topographic variations, differences in elevation or depth of the shot points, and the like, and, hence, the signals on each reproducible record appear in corresponding time positions. At least one of the signal traces on each reproducible record, for example, the trace reproduced by the head 24a, also includes the so-called "time break signal" which is obtained by recording a signal at the instant of detonation of the shot at each shot point as described in the aforementioned Hawkins application. When the reproducible records are played back in sequence it is, of course, essential that they be so correlated with respect to the rotation of the permanent record 13 that the starting points of all of the traces produced on the recording medium 13 coincide, as indicated by alignment of the time break signals reproduced from each record.

To effect the described alignment, manually operable means are provided for adjusting the time relationship between the rotation of the playback drum 21 and that of the camera drum 11 and, to facilitate the adjustment, each of the time break signals is applied prior to recording on the permanent record to a display unit 16 where it is compared with timing pulses produced by rotation of the drive mechanism for the camera drum 11. The adjustment of the time relationship between the drums 11 and 21 is then achieved, as illustrated in FIGS. 2 and 3, by manually operating a differential gearing 17 included in the drive mechanism 12 of the camera drum 11 in accordance with the indications provided by the display unit 16 as described more fully hereinafter.

More specifically, the camera drum 11 comprises a cylinder mounted upon a shaft 25 for rotation relative to a frame or housing (not shown) of the device 10 and this drum includes suitable fastening means described below for detachably holding the recording medium 13. Hence, by driving the shaft 25, the recording medium 13 is driven past the carriage 14 to induce the light beams developed by the latter unit to impinge upon the surface of the recording medium and provide for simultaneous recording of a plurality of seismic traces respectively corresponding to the signal traces reproduced from the record 23. To provide the described rotation of the drum 11, a spur gear 26 is splined to the shaft 25 (FIG. 2) included in the drive mechanism 12. A synchronous motor 27, which is identical to and excited from the same source as the synchronous motor 22a in the playback unit, forms a part of the drive mechanism 12 and has its armature shaft 28 connected to drive the differential gearing 17.

As previously mentioned, the differential gearing 17 functions ot phase relate or adjust the relative positions of the camera drum 11 and playback drum 21 prior to the recording of each group of signal traces reproduced from the various reproducible records sequentially loaded upon the drum 21, whereby the groups of traces are all correlated with respect to time. To this end, as shown in FIG. 3, the differential gearing 17 may be varied to adjust the relative phase relationship existing between its input shaft 28 and its output shaft 29, both of which are suitably journaled in a gear housing 43. Splined to the inwardly disposed ends of the shafts 28 and 29 are bevel gears 30 and 31, respectively, and these gears each mesh with another pair of bevel gears 32 and 33 extending perpendicularly to the gears 30 and 31, respectively, thereby to provide a power path from the motor 27 to the output shaft 29. The gears 32 and 33 are fixedly secured to studs 35 and 36, respectively, which are journaled in a cage 37. Apertures 37a and 37b in the cage 37 accommodate the shafts 28 and 29 and are dimensioned to permit rotation of the cage about these shafts.

In order to effect rotation of the cage 37 a rotatable shaft 38 is journaled in the housing 43 and carries a spur gear 39 in driving engagement with another spur gear 40 attached to the cage. Rotation of the shaft 38 is accomplished by means of a manually operable control knob 44 carried on its free end. When the shaft 38 is rotated to turn the cage 37, the bevel gears 32 and 33 are rotated about the drive axis of the bevel gears 30 and 31 to induce a relative phase displacement between the input shaft 28 and the output shaft 29. This relative phase displacement is not accompanied by a change in velocity due to the fact that the bevel gears are constantly in mesh.

The output shaft 29 of the differential gearing 17 drives a gear reduction mechanism 34 of conventional construction which is provided with an output pinion gear 41 in driving connection through a continuous notched belt 42 with the spur gear 26. Thus, operation of the synchronous motor 27 at substantially constant speed results in rotation of the camera drum 11 through the differential gearing 17 and the gear reduction mechanism 34 and, hence, drives the recording medium 13 past the carriage 14 at a constant angular velocity, although actuation of the differential gearing 17 may effect a temporary acceleration or deceleration to achieve the desired phase displacement. The gear reduction of the mechanism 34 is selected to provide for drive of the drum 11 at a speed suitable for recording the signals on the medium 13. In the event that the reproducible records are of the same length as the record 13, the drive reduction provided by the gear reduction mechanism in the drive connection 22b for the playback drum and that provided by the reduction mechanism 34 will be identical. However, if the lengths are dissimilar, the reduction mechanism will bear an inverse ratio to the length such that, regardless of the length of the reproducible records, the seismic traces are recorded over substantially the entire length of the medium 13. Since both of the synchronous motors for driving the camera and playback drums are excited from the same source, the described phase displacement between shafts 28 and 29 effects a corresponding phase displacement between the camera and playback drums, thereby to assure that the groups of signal traces sequentially reproduced from each reproducible record are all in proper phase or time relation.

In order to determine the adjustment required to phase relate each successive reproducible record with respect to the record 13, signals identifying the actual positions of each of the rotating camera and palyback drums are compared by the display unit 16 mounted adjacent to the camera drum 11. As indicated above, at the beginning of one signal trace on each of the reproducible records is the time break signal which serves as a reference for all of the traces appearing upon each of the reproducible records. This time break signal accordingly is used to identify the position of the playback drum.

In order to identify the position of the record 13 or the camera drum 11, there is provided a camera time pulse generator 49 (FIG. 2) operable to develop a series of time pulses as the camera drum is rotated. The generator 49 comprises a photodiode tube 50 energized by a beam of light 51 generated by a light source 52. The source 52 and the tube 50 are mounted on opposite sides of a peripherally slotted disc 53 fixedly secured to the shaft 25 of the camera drum 11 so that the beam of light 51 periodically passes through slots 54 in the disc and is intercepted by the portions of the disc disposed between the slots. As the light passes through each slot it impinges upon the photodiode tube 50 and the conduction of this tube may be employed to generate one pulse for each passage of the beam of light 51 through one of the slots 54. Obviously, no pulses are developed when the periphery of timing disc 53 intercepts the beam of light, and, accordingly, a series of spaced apart camera time pulses is obtained in response to rotation of the record 13 or the camera drum 11.

The slots 54 extend radially of the timing disc 53 and are spaced equidistantly around approximately 330° of its periphery, thereby providing a blank arc of 30° for identifying the first camera time pulse. Every tenth slot is of increased width to permit longer conduction of the tube 50 and thus to increase the width of every tenth pulse, thereby facilitating identification of the individual pulses in the series.

For the purpose of synchronizing the sweep circuits of the display unit 16 with the rotation of the camera drum 11, another pulse generator 60 is used to produce a so-called sweep-trigger pulse once every revolution of the camera drum. To this end, a photodiode tube 61 similar to the tube 50 is energized by a beam of light 62 passing from its source 63 through a single opening 64 defined in the timing disc 53. While opening 64 is illustrated as being circular in shape, it is preferably masked by a slotted disc which produces a well-defined beam of light for passage to the tube 61. The light beam 62, of course, is intercepted during the remainder of rotation of the disc 53 with the result that light impinges upon the tube 61 during only one brief instant in each revolution of the camera drum. The light beam induces the tube 61 to conduct during this brief instant to provide a burst or pulse of current which may be used to develop the sweep trigger pulse.

Figure 7:
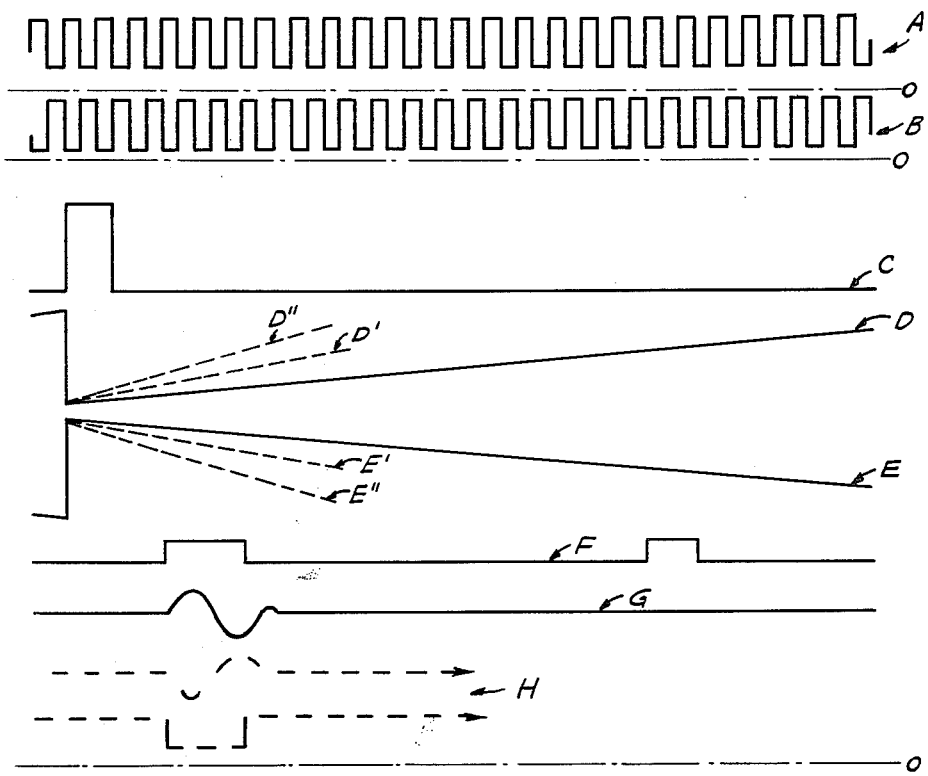
FIG. 7 is a view of the waveforms depicted by the display unit to facilitate alignment of the traces produced on the permanent record.

In order to display the time pulses and each of the reproduced time break signals on the screen of the oscilloscope tube 19 in the display unit 16, the output of the photodiode 50 and the output of the transducers 24a in the playback unit are both supplied to the vertical deflection circuit 66 of the display unit as illustrated in FIG. 5. Specifically, the time pulses are applied via conductor 70 to a pulse amplifier 77 for amplifying and clipping the pulses developed in the output circuit of the tube 50. The output of the pulse amplifier 77 is fed to a control amplifier 78 for developing a series of output pulses corresponding to the time pulses and represented by the waveform F in FIG. 7. A portion of the output of amplifier 78 appears on signal connector 75 and is used to produce, as described hereafter, on the record 13 a plurality of parallel time lines which serve as a time reference for the recorded seismic traces. Another portion of the output of the control amplifier 78 appears on connector 76 and is fed to the control electrode of one half 79a of a gated amplifier 79. The output of the transducer 24a is supplied through signal connector 74, through a time break pulse amplifier 81 and through connector 73 to the control electrode of the second section 79b of the gated amplifier tube 79.

In order to display the time pulse and the time break signals on base lines spaced vertically apart on the screen of the oscilloscope (FIGS. 8, 9 and 10) to facilitate comparison of the phase relationship therebetween, the input signals supplied to the gated amplifier 79 must be separated and should appear at different output levels. To this end, the sections 79a and 79b of the gated amplifier are respectively excited by square wave signals having the appearance of the waveforms A and B in FIG. 7, which signals are generated by a free running, dual-section multivibrator 82 and are passed through a gating amplifier 83. As indicated by the waveforms shown in FIG. 7, the repetition rate of the multivibrator 82 is relatively high, so that the square wave signals are of much higher frequency than the time pulses represented by waveform F. It is also apparent from FIG. 7 that the two square wave signals supplied to the gated amplifier 79 are 180° out of phase; that is, the square wave signal represented by waveform A is at a maximum positive level when the square wave signal represented by waveform B is at a minimum level and vice versa. A pair of square wave signals possessing the desired characteristics may, of course, be obtained from the respective plate circuits of the two sections of the multivibrator 82.

To facilitate the description, a schematic diagram of the gated amplifier 79 and the gating amplifier 83 is shown in FIG. 11. From this diagram it may be observed that the gating amplifier comprises two balanced sections 83a and 83b, one section 83a of which has its control grid energized by square wave signals applied from the multivibrator 82 via conductor 120 and coupling condenser 151 and the other section 83b of which has its control grid energized by oppositely phased square wave signals applied from the other section of the multivibrator 82 via conductor 122 and coupling condenser 153. The control grids of both of the sections 83a and 83b are normally somewhat positive by virtue of the fact that they are tied through relatively large grid resistors 154 and 155, respectively, to a voltage divider network consisting of resistors 156 and 157 connected in series between the power supply voltage B+ and ground. Since the resistor 156 is much larger than the resistor 157, the grids of the two sections of the gating amplifier are only slightly positive. The cathodes of the sections 83a and 83b are connected directly to the cathodes of sections 79a and 79b of the gated amplifier 79 by means of conductors 158 and 159, respectively. The latter conductors are interconnected by a pair of resistors 160 and 161 of equal size connected in series with each other and with a balancing potentiometer 162. The variable tap 162a of the balancing potentiometer 162 is connected directly to ground, so that the cathode-to-ground resistances in the two sections 83a and 83b of the gating amplifier may be varied. Obviously, whenever one of these cathode resistances is increased by adjustment of the potentiometer 162, the other is decreased by a corresponding amount, assuming, of course, that the potentiometer is linear. The electrode current flow of section 83a of the gating amplifier and section 79a of the gated amplifier both pass through the cathode resistor 160 and through that portion of the potentiometer 162 which is in the cathode-to-ground circuit of these two sections. Similarly, the electrode current flow of sections 83b and 79b passes through the cathode resistor 161 and through that portion of potentiometer 162 which is in the cathode-to-ground circuit of section 83b.

The potentiometer 162 is so adjusted that the cathode-to-ground resistances of the sections 79a and 79b are unequal in order to provide for the development of the dual level output signal referred to above. More specifically, the square wave signal applied to the section 83a of the gating amplifier 83 results in the development of a similar square wave signal across the cathode-to-ground resistance appearing between conductor 158 and the grounded variable tap 162a of the balancing potentiometer 162. Thus, during the intervals when the square wave signal input to the section 83a is at its maximum positive level, the gating amplifier section 83a is driven to saturation and, as a result, the signal appearing between conductor 158 and tap 162a is at a maximum positive level. However, when the input signal to the section 83a is at its minimum level, for example at zero potential, a relatively small current flow is nevertheless produced through the section 83a by virtue of the fact that its grid is connected to the small positive potential derived from the voltage divider network consisting of resistors 156 and 157. This small current flow through the section 83a causes the signal appearing between conductor 158 and tap 162a to drop to a small positive level the magnitude of which is a function of both the positive voltage appearing on the grid of the section 83a and the cathode-to-ground resistance of section 83a. The potential to which the signal drops may, of course, be altered by adjusting the potentiometer 162. Obviously, by increasing the cathode-to-ground resistance in the section 83a, the minimum voltage attained by the signal appearing between conductor 158 and tap 162a is increased and by decreasing the resistance the minimum voltage is decreased. A similar action occurs in the section 83b. However, it will be recognized that the adjustment of potentiometer 162 causes the cathode-to-ground resistance of sections 83a and 83b to vary inversely; that is, as the cathode-to-ground resistance of section 83a is increased that of section 83b decreases and vice versa. Moreover, it will be recalled that the input square wave signal to the section 83b is 180° out of phase with the square wave input signal to the section 83a and, as a result, the square wave signal developed between conductor 159 and variable tap 162a is 180° out of phase with the square wave signal developed between conductor 158 and the tap 162a. The minimum voltage attained by the signals appearing between conductor 159 and tap 162a is, again, a function of the setting of the balancing potentiometer 162. As previously indicated, the latter potentiometer is preferably so adjusted that the minimum level of the signals appearing between conductor 159 and the tap 162a is more positive than the minimum level of the signals appearing between conductor 158 and tap 162a.

The gated amplifier 79 is cathode coupled to the gating amplifier 83, as previously described. Accordingly, during the intervals when the signal appearing between conductor 158 and tap 162a is at its maximum positive level, section 79a of the gated amplifier is cut off and during those intervals when this signal is at its minimum level the section 79a conducts by an amount dependent upon this minimum signal level. Correspondingly, during those intervals when the signal appearing between conductor 159 and tap 162a is at its maximum positive level, the section 79b of the gated amplifier is cut off and during those intervals when this signal is at its minimum positive level a current flow occurs through the section 79b, the magnitude of the latter current being dependent upon the level of the input signal. Thus, disregarding for the present the two signals supplied to the control grids of the sections 79a and 79b, it will be observed that the two sections of the gated amplifier 79 are alternately rendered conductive. The currents flowing from these two sections are combined and developed across a plate load resistor 164 and this combined signal output is then passed through a push-pull amplifier 80 of conventional construction to the vertical deflection plates 19a of the cathode ray oscilloscope. Thus, during those intervals when the section 79a is cut off, the section 79b develops a plate current having a magnitude which is a function of the minimum level attained by the signal appearing between conductor 159 and tap 162a and, conversely, during those intervals when the section 79b is cut off, the section 79a conducts by an amount which is dependent upon the minimum level attained by the signal appearing between conductor 158 and tap 162a. Due to the inequality between the minimum levels of the two described input signals, the signal appearing across plate resistor 164 actually comprises two alternately developed voltage levels.

Superimposed upon these levels are the input signals supplied to the grids of the sections 79a and 79b. As previously described, the input signal to the control grid of the section 79a has the appearance of the waveform F shown in FIG. 7. The magnitude of this input signal is such that it is insufficient to drive the section 79a beyond cutoff during those intervals when the square wave input signal to this section appearing between conductor 158 and tap 162a is at a maximum positive level. However, during the intervals when the cathode-to-ground input signal to the section 79a is at a minimum positive level, the positive timing pulse applied to the control grid of the section 79a causes an increase in plate current flow and, hence, produces a greater voltage drop across the resistor 164. Similarly, the amplitude of the time break signal applied to the control grid of the section 79b is insufficient to drive the latter section beyond cutoff during the intervals when the signal appearing between conductor 159 and tap 162a is at a maximum positive level, but during those intervals when the latter signal is at a minimum level the time break signal alters the plate current flow through the section 79b and, hence, induces a corresponding variation in the output signal appearing across resistor 164.

The time break signal supplied to section 79b is developed across a potentiometer 163 interposed between connector 73 and ground and having its variable tap connected directly to the control grid of section 79b. The potentiometer 163 may be adjusted to alter the amplitude of the time break signal developed across plate resistor 164 and, hence, to adjust the height of this signal on the screen of the cathode ray oscilloscope. In view of the foregoing description, it will be apparent that the signal appearing across the resistor 164 has the appearance of the waveform H illustrated in FIG. 7, wherein a dual level output signal is provided, one level of which carries the time pulses and the other level of which carries the time break signal. As previously described this signal is passed through the push-pull amplifier 80, where it is inverted and is then applied to the vertical deflection plates of the cathode ray oscilloscope 19.

In order to providing an excitation signal for the horizontal sweep circuit of the display unit 16, as indicated above, the sweep-trigger pulse developed by the photo-diode tube 61 is applied by connector 94 to the input of a sweep generator 95. The horizontal sweep circuit comprises the sweep generator 95, a linear amplifier 96, and a push-pull amplifier 97, all of which operate in a conventional manner to provide a pair of push-pull sawtooth waves of the type represented by waveforms D and E in FIG. 7 for application to the opposed horizontal deflection plates 19b of the cathode ray oscilloscope 19. Since one sweep-trigger pulse is produced for each revolution of the timing disc 53, the electron beam of the oscilloscope is swept across the screen once during every complete turn of the camera drum and during this sweep the dual level signal supplied from the push-pull amplifier 80 containing both the time pulses and the time break signal is applied to the vertical deflection plates 19a. As previously described, the time pulses and the time break signal appear upon different output levels of the signal supplied to the vertical deflection plates and, hence, they are vertically displaced on the screen of the cathode ray oscilloscope in the manner illustrated in FIG. 8.

Since the time pulses represent the position of the camera drum 11 and the recording medium 13 and since the time break signal is an indexing signal indicating the beginning of the signal traces reproduced from each of the reproducible records, the relative position of these signals on the screen of the cathode ray oscilloscope is representative of the time relationshop existing between the camera drum and the playback drum. Specifically, when the time break signal and the initial timing pulse are vertically aligned on the screen of the oscilloscope, the signals reproduced from the reproducible record are time related with respect to the recording medium 13 and are in proper time position to be recorded. To bring the initial time pulse and the time break signal into vertical alignment, the differential gearing 17 previously described may be manually adjusted, thereby altering the time position of the time pulses. Adjustment of the differential gearing 17 has the effect of moving the time pulses laterally of the cathode ray oscilloscope and, hence, the differential gearing is adjusted until the initial time pulse is directly above the time break signal. As previously indicated, the blank portion of the disc 53 provides a relatively large time interval during which no time pulses are developed and, accordingly, the initial time pulse appearing on the cathode ray oscilloscope may readily be identified, as will be apparent by reference to FIG. 8.

To provide for accurate alignment of the initial time pulse and the time break signal, the horizontal sweep circuit may be altered to provide sweeps of different speeds, as, for example, a slow, medium and fast sweep. To effect the initial alignment, the horizontal sweep circuit is adjusted to provide the slow sweep, at which time the sweep circuit, as previously indicated, develops sawtooth waves having the appearance of the waveforms D and E in FIG. 7. With the horizontal sweep circuit so adjusted, the initial timing pulse is aligned with the time break signal in the manner described above, after which the horizontal sweep circuit is adjusted to provide its medium sweep speed. When so adjusted, the sweep circuit develops push-pull sawtooth waves represented by the waveforms D' and E' in FIG. 7. The latter waveforms have the same peak amplitude but are of less duration than the waveforms D and E and, accordingly, the electron beam is swept across the screen of the oscilloscope at a speed somewhat greater than the speed provided by the slow sweep. The signal passed by the push-pull amplifier 80 is, of course, still applied to the vertical deflection plates 19a and, hence, the result of the medium speed sweep is to produce on the screen of the oscilloscope only a portion of the trace provided by the slow sweep, as illustrated in FIG. 9.

With the horizontal sweep circuit adjusted to provide its medium speed sweep, the initial time pulse is again aligned with the time break signal, after which the horizontal sweep circuit is adjusted to develop its fast sweep speed. The latter adjustment causes the horizontal sweep circuits to develop push-pull sawtooth waves having waveforms D″ and E″ illustrated in FIG. 7, with the result that the electron beam is swept across the screen of the oscilloscope 19 at relatively high speed. Obviously, only a small portion of the entire trace appears on the face of the oscilloscope when the horizontal sweep circuit is set for the fast speed sweep. The screen of the oscilloscope thus exhibits the portion of the trace shown in FIG. 10 in which the initial timing pulse and the time break signal are relatively large and, hence, may be vertically aligned with comparative ease.

In view of the foregoing description, it will be recognized that the slow, medium and fast speed sweeps may be employed to effect coarse, medium and fine adjustment of the time relationship existing between the initial time pulse and the time break signal. Thus, by aligning the time break indexing signals reproduced from each of the reproducible records with the initial timing pulse, the reproduced signals may be time related so that the starting points of the traces appearing on the recording medium 13 all coincide and, hence, these traces may be said to be zeroed or time related.

As previously described, to provide for recording the groups of signal traces sequentially reproduced from the reproducible records in side by side relation on the medium 13, the recording instruments are housed within the carriage 14 mounted adjacent to and movable laterally of the camera drum 11. Specifically, the carriage 14 includes pairs of support blocks 100 having aligned apertures therein for receiving a pair of fixed parallel guide rails 101. The carriage may be manually moved along the rails 101 to preselected positions relative to the camera drum 11 when the different reproducible records are applied on the drum 21 with the result that the carriage occupies a different position for each reproducible record played back. In accordance with one application of the present invention, the medium 13 is of sufficient width to receive 96 side by side seismic traces and, since each reproducible record contains 24 different traces, four such reproducible records may be played back in sequence after movement of the carriage to four different positions displaced laterally of the recording medium. A marker 102 secured to the carriage 14 cooperates with graduations 104 on a fixed scale 103 to indicate the position of the carriage with respect to the recording medium 13. A manually operable control knob 99 having a spur gear (not shown) on its inner end may be manually rotated to move the spur gear along a fixed rack gear (not shown) in order to position the carriage 14 in each of the preselected positions.

In the playback unit 20, transducers 24a, 24b, 24c, etc. reproduce the signals magnetically stored in the record 23 as the drum 21 is rotated. The signal from each transducer is supplied through a connector and through suitable amplifiers (not shown) to a recording galvanometer 105 of a galvanometer unit 106 (FIG. 4) housed within the carriage 14. Each recording galvanometer 105 is conventional and each includes a deflection mirror 105a operable in response to the electrical signal from the transducer to deflect a beam of light 107 emanating from a light source 108, one such light source being provided for each deflection mirror. Specifically, each beam of light 107 is reflected by its associated mirror 105a onto a mirror 109 which, in the position shown in FIG. 4 termed a non-recording position, reflects all of the beams of light 107 onto a viewing window 110 disposed on the top of the carriage 14, and which, when in a second position termed the recording position, is displaced out of the path of the beam of light 107 to permit passage of all of the beams through a lens assembly 111 onto the medium 13. The mirror 109 forms part of a shutter mechanism indicated generally as 145 in FIG. 4 and this mirror is adapted to be pivoted about a pin 109a by means of a pair of solenoids 142 and their movable cores 143, in order to effect movement of the mirror between its two described positions. When the mirror is in its non-recording position, the reflections visible through the window 110 inform the operator that the playback unit and the recording galvanometers are functioning.

As indicated above, the time pulses developed by the photodiode 50 may be employed to produce a plurality of parallel reference lines on the record 13. To this end, there is provided a pair of glow tubes 112 energized by pulses appearing on connector 75 from the control amplifier 78. These pulses induce the glow tubes to produce periodic flashes of light directed along a path 113, each such flash having a length approximately equal to the width of the carriage. The light from the tubes 112 is reflected by a fixed mirror 114 onto the mirror 109 when the latter is in its non-recording position, and onto the record 13 through the lens assembly 111 when the mirror 109 is in its recording position.

Figure 6:
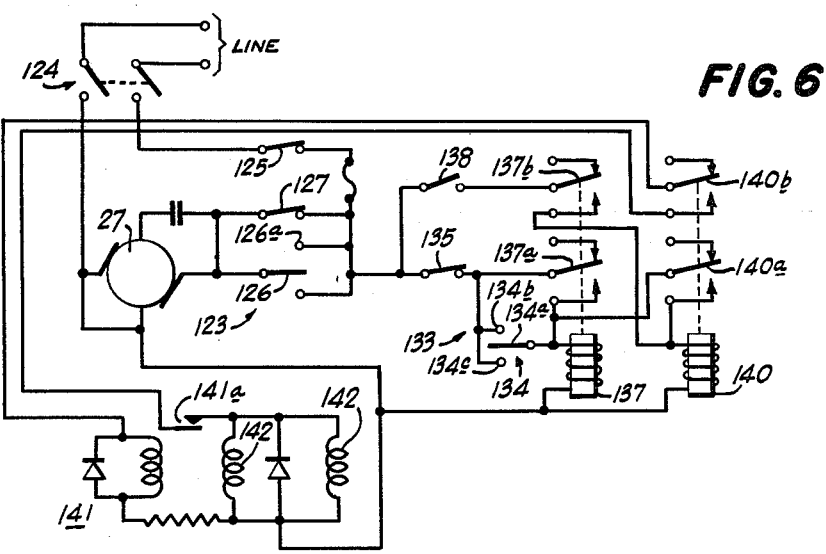
FIG. 6 is a detailed schematic view of the control circuit used in loading and unloading the permanent record on the camera drum and in recording.

In order to facilitate loading the medium 13 onto the camera drum 11 and to facilitate removal of the medium from the drum, a control circuit 123, illustrated schematically in FIG. 6, is employed. The drum control circuit 123 supplies excitation for the synchronous motor 27 of the drive mechanism 12 and causes the camera drum 11 to be rotated for one revolution and then to be automatically stopped at such a predetermined position that the record fastening mechanism is readily accessible to the operator.

The record fastening mechanism may be of any type known in the art but that illustrated in FIG. 1 includes a plurality of spaced apart pins or stubs 115 formed on the drum 11 and extending into a transverse opening 116 in the drum. The pins 115 are adapted to mate with correspondingly spaced perforations in one end of the recording medium 13 while the other end of the medium is secured to the drum by means of a pivot assembly 117. The latter assembly may include a crossbar 118 carrying a plurality of spaced apart pointed projections or pins 119 adapted to penetrate and hold the medium 13. The crossbar 118 is suspended upon opposed arms 118a pivotally mounted upon the drum.

As shown in FIGS. 5 and 6, the camera drum motor 27 is energized through a line switch 124, a motor on-off switch 125 and a parallel circuit including a manually operable switch 126 and an automatically operable switch 127. The latter switch 127, as shown in FIG. 2, comprises a conventional normally closed microswitch fixedly secured to a portion 128 of the recording device frame or housing adjacent to the spur gear 26. A roller 129 rotatably carried on the free end of a flexible contact arm 139 of the switch 127 is then engaged by a cam 171 attached to the gear 26 in order to open the switch 127. Thus, when the camera drum 11 is in its loading position illustrated in FIG. 1, that is, when the drum 11 is so positioned that the record fastening means is accessible, the cam 171 engages the roller 129 to open the switch 127 and, hence, to break one branch of the parallel circuit. When the drum 11 is oriented in the described position, the pins 115 are inserted into the perforations in the end of the medium 13.

In order to initiate operation of the camera drum 11 after the pins 115 have been inserted into the perforations, the switch 126 is manually actuated for a brief period to energize the drum motor 27 through the other branch of the parallel circuit. After the cam has moved out of engagement with the switch 127 the manual switch 126 may be released, whereupon the motor 27 is energized through the first branch of the parallel circuit including the switch 127. After one complete revolution of the camera drum 11 with attendant rotation of the gear 26 in a clockwise direction as viewed in FIG. 2, the cam 171 automatically opens the switch 127 in the manner described above to arrest movement of the camera drum 11, at which time the other end of the recording medium 13 is fixedly attached to the camera drum 11 by means of the assembly 117, thereby to complete the loading operation. The arm of the switch 126 may also be actuated to a continuously closed position in engagement with contact 126a to provide for uninterrupted rotation of the camera drum 11 after the loading operation is completed. The playback unit 20 may be provided with a similar control circuit and a record fastening mechanism similar to that described above may be employed on the drum 21, although these are not shown in the drawings.

In the operation of the equipment thus far described, the recording medium 13 is loaded on the camera drum 11 in the manner indicated, the carriage 14 is first moved to its extreme left position as viewed in FIG. 1, the first reproducible record is mounted on the playback drum 21 and the line switch 124 is closed. Incident to closing of the switch 124, line voltage is supplied to the drum control circuit 123, to the high voltage power supply 121 and filament transformer 121a for the oscilloscope 19, to a power supply 132a for energizing the vacuum tubes in the display unit 16, and to a low voltage supply 132 for energizing the galvanometer light source 108, the glow tubes 112 and the light sources 52 and 63 of the pulse generators 49 and 60. The next preliminary operation required is the actuation of the manually operable switch 126 to its continuously closed position in engagement with contact 126a, which effects continuous rotation of the camera and playback drums with the result that the signal traces on the reproducible record are reproduced and fed into the recording instruments 105. The plurality of light beams 107 are deflected by the mirror 109 onto the viewing screen 110, as is the intermittent light beam 113 emanating from the glow tubes 112 in order to indicate that the recording instruments are operating. Next, the camera and playback drums are phase-related by manual adjustment of the differential gearing 17 in the manner described above.

In order to prevent superimposed recording, the shutter means 145 is controlled by a circuit 133 illustrated in FIG. 6 in such manner that the mirror 109 is in its recording position for only one revolution of the camera and playback drums. Briefly, circuit 133 functions to control the energization of the solenoids 142 to displace the mirror 109 and permit passage of light to the lens 111 when the camera drum is rotated past its initial recording position and thereafter to release the solenoids in order automatically to return the mirror 109 to its non-recording position after the camera drum has completed one revolution. Specifically, a manually operable switch 134 having a temporarily closed position in which arm 134a engages contact 134b and a continuously closed position in which arm 134a engages contact 134c is first placed in its temporarily closed position to complete a circuit through a normally closed microswitch 135 to a relay coil 137. The microswitch 135 is fixedly secured to an element 136 of the recording device frame and is opened and closed by a second cam 131 mounted on the gear 26. The cams 131 and 171 are offset so that the cam 131 does not operate switch 127 and cam 171 does not affect switches 135 or 138. The actuation of relay 137 resulting from the closing of switch 135 causes contacts 137a and 137b to operate. Contact 137a completes a shunt path for by-passing the switch 134, and, hence, the latter can be manually released. The closing of the contact 137b prepares an operating circuit for a relay 140. This circuit includes a normally open microswitch 138 secured to a fixed element 139 of the recording device frame. Shortly after the cam 131 rotates past the switch 135, it engages the switch 138 (at the initial recording position) and closes the operating circuit for the relay 140 which, in turn, closes its pair of contacts 140a and 140b. The closing of contact 140a completes a holding circuit for the relay 140 through the contact 137a of relay 137 and the switch 135 such that the relay 140 is maintained operated under the control of switch 135 independently of switch 138. The latter switch is immediately opened as it is disengaged from the cam 131 by continued rotation of gear 26. The closing of the contact 140b completes an operating circuit for a relay 141 which, in turn, closes contact 141a to complete a circuit for energizing the shutter solenoids 142, whereby the reflecting mirror 109 is pivoted about pin 109a and, hence, is displaced to its recording position.

Incident to the described displacement of the reflecting mirror 109, the light beams 107 and 113 are projected through the lens assembly 111 onto the record 13 to effect the simultaneous recording of the seismic traces and the time reference lines. The recording operation is continued throughout one revolution of the camera drum 11 and is terminated automatically by the opening of the switch 135 when the latter is engaged by the cam 131. The opening of the switch 135 opens both of the operating circuits for the relays 137 and 140 with the result that all of the relays 137, 140 and 141 are released and the shutter solenoids 142 are de-energized. De-energization of the solenoids 142 allows the mirror 109 to return to the position illustrated in FIG. 4, at which time it again intercepts the light beams 107 and 113 and prevents further recording of both the traces and the reference time lines. By this arrangement, double recording of signals on the same trace is avoided, since the recording operation is terminated after one complete revolution of the drum despite the continued rotation of the camera and playback drums.

After the recording of the first group of seismic traces from the signal traces reproduced from the first reproducible record, the switch 126 is manually opened to stop the movement of both the camera and playback drums. The first reproducible record is then replaced by a second reproducible record on the playback drum and the carriage 14 is moved to the right as viewed in FIG. 1 to a position such that the second group of traces is recorded in side by side relation ot the first group and the traces are equidistantly spaced apart. The signals reproduced from the second reproducible record are then "zeroed" by adjustment of the differential gearing 17 in the manner previously described and the recording operation is then repeated. This procedure is repeated for each reproducible record supplied to the playback unit 20. After the reproducing and recording of the last group of traces from the last reproducible record, the record 13 is unloaded from the camera drum 11 under the control of the drum loading circuit 123 in a manner generally similar to that described above.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. Apparatus for producing a single cross-section record of subsurface earth formations from a plurality of reproducible records each containing a plurality of side by side seismic traces, said apparatus comprising means for playing back said reproducible records, the playback means including a plurality of reproducing devices for simultaneously reproducing from each record a set of signals respectively corresponding to the seismic traces on that reproducible record, recording means responsive to said sets of signals for developing side by side sets of traces on said cross-section record with each set of traces corresponding to the seismic traces appearing on one of said reproducible records, and means for correlating the operation of said play back means with said recording means so that the different sets of traces on said cross-section record appear in corresponding time positions.

2. Apparatus for producing a single cross-section record of subsurface earth formations from a plurality of reproducible records each containing a plurality of side by side seismic traces and at least one of said traces of each reproducible record including a time reference signal, said apparatus comprising means for playing back said reproducible records, the playback means including a plurality of reproducing devices for simultaneously reproducing from each record a set of signals respectively corresponding to the seismic traces and the time reference signal on that reproducible record, recording means responsive to the sets of signals produced by the play back means for developing side by side sets of traces on said cross-section record with each set of traces corresponding to the seismic traces appearing on one of said reproducible records and with one trace of each set including a signal corresponding to the time reference signal, and means for correlating the operation of said play back means with said recording means so that the different sets of traces on said cross-section record appear in corresponding time positions with the time reference signals of all of the sets of traces in alignment.

3. Apparatus for producing a single cross-section record of subsurface earth formations from a plurality of reproducible records each containing a plurality of side by side seismic traces, said apparatus comprising means for playing back said reproducible records one at a time and in sequence, the playback means including a plurality of reproducing devices for simultaneously developing a set of signals with each such signal corresponding to one of the seismic traces on the reproducible record being played back, recording means responsive to said signals for developing sets of traces on said cross-section record respectively corresponding to the seismic traces appearing on said reproducible records with the traces of each set being developed simultaneously in response to the reproduction of a set of said signals, means for relatively moving said cross-section record and said recording means in a direction extending laterally of the traces on the cross-section record following the playback of each reproducible record so that all of the sets of traces are recorded in side by side relationship, and means for correlating the operation of said play back means with said recording means so that the different sets of traces on said cross-section record appear in corresponding time positions.

4. Apparatus for producing a single cross-section record of subsurface earth formations from a plurality of reproducible records each containing a plurality of side by side seismic traces, said apparatus comprising means for playing back said reproducible records one at a time, the playback means comprising a plurality of reproducing devices each effective to reproduce one of said traces so that all of the traces on each record are reproduced simultaneously, recording means responsive to the signals produced by said reproducing devices for simultaneously developing a set of traces on said cross-section record with each such trace corresponding to the seismic traces appearing on the reproducible record being played back, means for relatively moving said cross-section record and said recording means in a direction extending laterally of the traces on the cross-section record after each reproducible record has been played back so that all of the sets of traces are recorded in side by side relationship, and means for relatively displacing said cross-section record and each reproducible record in order to control the time relationship existing between the signals to be recorded upon the cross-section record, said last named means being adjustable to produce a displacement sufficient to record the different sets of traces on said cross-section record in corresponding time positions.

5. Apparatus for producing a single cross-section record of subsurface earth formations from a plurality of reproducible records each containing a plurality of side by side seismic traces, said apparatus comprising means for playing back said reproducible records one at a time and in sequence, the playback means comprising a plurality of reproducing devices each effective to reproduce one of said traces so that all of the traces on each record are reproduced simultaneously, recording means responsive to the signals produced by said reproducing devices for simultaneously developing a set of traces on said cross-section record with each such trace corresponding to one of the seismic traces appearing on the reproducible record being played back, means for relatively moving said cross-section record and said recording means in a direction extending laterally of the traces on the cross-section record following the playback of each reproducible record so that all of the sets of traces are recorded in side by side relationship, and manually operated means for relatively moving said recording means and said cross-section record in a direction extending longitudinally of the cross-section record prior to the recording of each set of traces in order to alter the time relationship between the signals to be recorded upon said cross-section record, the last named means being effective to produce a displacement sufficient to record the different sets of traces on said cross-section record in corresponding time positions.

6. Apparatus for producing a single cross-section record of subsurface earth formations from a plurality of reproducible records each containing a plurality of side by side seismic traces, said apparatus comprising reproducing means for developing signals corresponding to the seismic traces on said reproducible records, first drive means for moving each of said reproducible records past said reproducing means one at a time to simultaneously develop a group of signals from each reproducible record with each of the signals of said group corresponding to one of the traces on the record, recording means responsive to the groups of signals developed by the reproducing means for simultaneously recording the signal of each group on said cross-section record with each such group developing a set of traces on said cross-section record, second drive means operated in synchronism with said first drive means for repeatedly moving said cross-section record past said recording means, means mounting said recording means for movement in a direction extending laterally of the sets of traces after each set of traces has been produced so that said sets of traces are recorded in side by side relationship as said cross-section record is moved past the recording means, and means for altering the time relationship between said first and second drive means in order to correlate the movement of each reproducible record with the movement of the cross-section record so that the different sets of traces on said cross-section record appear in corresponding time positions.

7. The apparatus defined by claim 6 wherein the mounting means includes manually operated mechanism which is effective to move the recording means laterally of the traces on the cross-section record.

8. The apparatus defined by claim 7 wherein there is additionally provided means for relatively displacing said cross-section record and each reproducible record prior to playing back until their time positions coincide so that the different sets of traces on said cross-section record appear in corresponding time positions with the time reference signals of all of the sets of traces in alignment.

9. In an apparatus for producing a single cross-section record of subsurface earth formations from a plurality of reproducible records each containing a plurality of seismic traces and at least one of said traces including a time reference signal, the combination of means for playing back said reproducible records one at a time and in sequence, the playback means comprising a plurality of reproducing devices for simultaneously developing from each reproducible record a set of signals respectively corresponding to the seismic traces and the time reference signals on the reproducible record being played back, recording means responsive to each set of signals produced by the play back means for developing side by side sets of traces on said cross-section record with each set of traces corresponding to the seismic traces appearing on one of said reproducible records and with one trace of each set including a signal corresponding to the time reference signal on said one reproducible record, said recording means including a recording device and means for repeatedly driving said cross-section record past said device to record the traces thereon, means operated in synchronism with the driving means for developing a series of timing signals representative of the position of the cross-section record, and means for visually comparing the timing signals with the time reference signal reproduced from each reproducible record in order to indicate the relative time positions of each reproducible record and the cross-section record.

10. A recording device as defined by claim 9 wherein there is additionally provided means operable in response to said timing signals for recording a plurality of time reference lines on said cross-section record.

11. The structure defined by claim 9 wherein the visual comparing means comprises an oscilloscope including a viewing screen and a sweep circuit effective to develop a sweep signal for sweeping an electron beam across said screen, means operated in synchronism with said driving means for rendering said sweep circuit operative to develop said sweep signal, and means for applying both said timing signals and the time reference signal to the oscilloscope as said electron beam is swept across said screen so that the time relationship between the timing signals and the time reference signal may be observed on the viewing screen of the oscilloscope.

12. Apparatus for recording on a photosensitive medium a signal trace corresponding to a seismic trace reproduced from an original seismic record, said apparatus comprising means for reproducing a seismic trace from said record, a recording device including means for directing at least one light beam onto said medium to record a signal trace corresponding to the reproduced seismic trace, drive means for rotating said medium past said recording device throughout a recording interval, a shutter for controlling the passage of said light beam to said medium, means for selectively moving said shutter between a first position wherein the light beam is passed to said medium and a second position wherein said light beam is intercepted and is prevented from impinging upon said medium, and control means operated in synchronism with the driving means for rendering the shutter moving means effective to move the shutter to said first position at the start of the recording interval and for rendering the shutter moving means automatically effective to move the shutter to said second position at the completion of the recording interval, thereby to prevent superimposed recording of signals on said medium.

13. The recording device defined by claim 12 wherein the shutter moving means includes a solenoid and the control means includes a pair of spaced apart switches connected in an electrical circuit with said solenoid and actuated by said drive means, said drive means being effective to operate one of said switches at the start of the recording interval in order to render the solenoid effective to move the shutter to said first position and the other of said switches being operated by the drive means at the completion of the recording interval in order to render the control means effective to cause the solenoid to move the shutter from the first position to the second position.

14. The device of claim 12 wherein there is additionally provided means for visually observing the light beams when said shutter means is in its light intercepting position.

15. Apparatus for producing a cross-section record of subsurface earth formations from a plurality of reproducible records each containing a plurality of seismic traces, said apparatus comprising a frame, a drum supported on said frame and operatively engaging said cross-section record, means for playing back said reproducible records one at a time and including a plurality of reproducing devices for simultaneously developing a group of signals from each reproducible record, a carriage supported on said frame and movable to different positions displaced laterally with respect to said cross-section record, means on said carriage cooperating with said cross-section record to record simultaneously a set of side by side seismic traces from each group of signals, and means for moving said carriage from one of said positions to another in sequence in order to record the different sets of traces in side by side relationship on said cross-section record.

References Cited in the file of this patent

UNITED STATES PATENTS

| | | |
|---|---|---|
| 2,440,971 | Palmer | May 4, 1948 |
| 2,544,569 | Silverman | Mar. 6, 1951 |
| 2,604,955 | Hawkins | July 29, 1952 |
| 2,710,070 | Merten | June 7, 1955 |
| 2,767,389 | McCollum | Oct. 16, 1956 |
| 2,779,428 | Silverman | Jan. 29, 1957 |
| 2,795,287 | Sharpe | June 11, 1957 |
| 2,803,515 | Begun et al. | Aug. 20, 1957 |
| 2,806,757 | Cunningham | Sept. 17, 1957 |
| 2,821,892 | Merten | Feb. 4, 1958 |
| 2,837,729 | Houghton et al. | June 3, 1958 |
| 2,841,777 | Blake et al. | July 1, 1958 |
| 2,861,507 | Palmer | Nov. 25, 1958 |
| 2,876,428 | Skelton | Mar. 3, 1959 |
| 2,912,673 | Groenendyke | Nov. 10, 1959 |